United States Patent [19]

Sten et al.

[11] 3,934,133

[45] Jan. 20, 1976

[54] APPARATUS FOR THE CORRECTION OF SHEAR FORCES

[75] Inventors: Leif Ragnvald Sten, Staffanstorp; Nils Runol Gustav Ohlsson, Akarp, both of Sweden

[73] Assignee: Kockums Mekaniska Verkstads AB, Malmo, Sweden

[22] Filed: May 22, 1973

[21] Appl. No.: 362,992

[30] Foreign Application Priority Data

May 30, 1972 Sweden .............................. 7069/72

[52] U.S. Cl. ............. 235/193; 235/150.2; 235/184; 328/137

[51] Int. Cl.[2] ........................ G06G 7/12; H04Q 3/00

[58] Field of Search ................. 235/193, 150.2, 184; 340/146.2, 172; 328/115, 137

[56] References Cited

UNITED STATES PATENTS

| | | | |
|---|---|---|---|
| 3,031,142 | 4/1962 | Cohen et al. | 235/193 |
| 3,128,375 | 4/1964 | Grimnes | 235/150.2 |
| 3,329,808 | 7/1967 | Fisher | 235/150.2 |
| 3,330,948 | 7/1967 | Single | 235/184 |
| 3,354,703 | 11/1967 | Russell, Jr. et al. | 235/184 |
| 3,408,487 | 10/1968 | De Wilde | 235/193 |
| 3,415,979 | 12/1968 | Bussell et al. | 235/150.2 |
| 3,584,503 | 6/1971 | Senour | 235/150.2 |

*Primary Examiner*—Malcolm A. Morrison
*Assistant Examiner*—Errol A. Krass
*Attorney, Agent, or Firm*—Browne, Beveridge, DeGrandi & Kline

[57] ABSTRACT

Apparatus for displaying a corrected value of the total shear force in a given cross-section of a ship, comprising means for generating a signal representing the total shear force in the selected cross-section and means for modifying said signal in relation to the cargo forward and aft of said cross-section.

2 Claims, 1 Drawing Figure

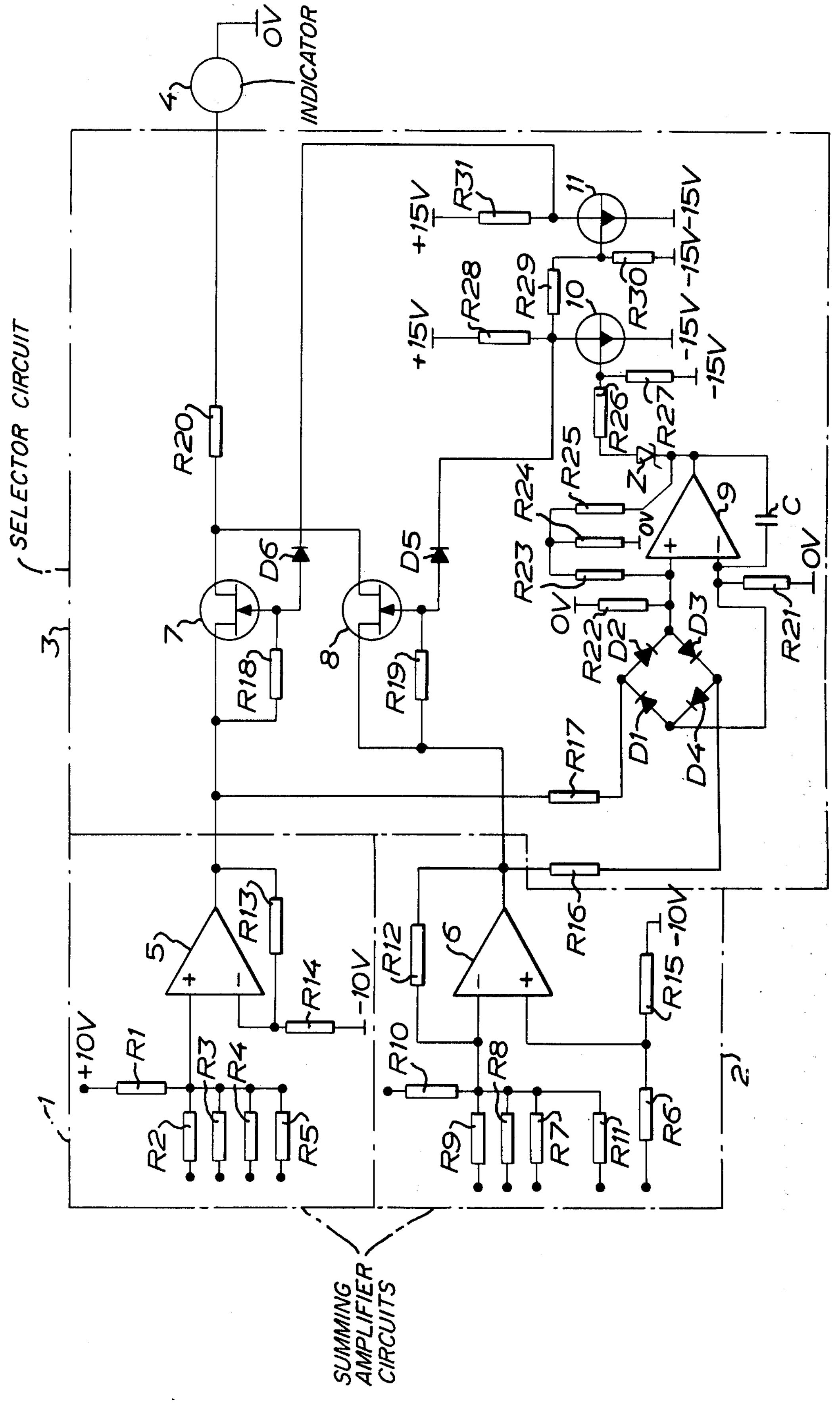
INDICATOR
SELECTOR CIRCUIT
SUMMING AMPLIFIER CIRCUITS
0V
+15V
-15V
+10V
-10V
R1
R2
R3
R4
R5
R6
R7
R8
R9
R10
R11
R12
R13
R14
R15
R16
R17
R18
R19
R20
R21
R22
R23
R24
R25
R26
R27
R28
R29
R30
R31
D1
D2
D3
D4
D5
D6
Z
C
1
2
3
4
5
6
7
8
9
10
11

APPARATUS FOR THE CORRECTION OF SHEAR FORCES

The present invention relates to an apparatus for correcting a total sheer force in a given cross-section of a ship for the distribution of shear forces within said section, a signal representing the total shear force within said cross-section being generated by means of an electronic or electromechanical device for establishing the total shear force within a selected cross-section of the ship.

There are previously known various electronic and electromechanical aids for calculating the bending and shear force stresses of a ship with respect to a desired cargo distribution to avoid non-permissible bending and shear force stresses within the compartments of the hull. These electronic or electromechanical aids frequently operate on a principle according to which the deadweight is obtained by adding useful load, bunker and ballast, the displacement is obtained by adding the deadweight and the lightweight, and the mean draught is a function of the displacement. The ship's trim is obtained by taking the difference between the load moments of the fore and aft halves of the ship. The shear force in a selected cross-section of the ship is obtained as the algebraic sum of the displacement, the lightweight, the cargo within the compartment concerned, and the shear force within the section between two compartments, while the bending moment is obtained by multiplying the shear force with the distance to the point of attack. The shear force thus established is the total shear force within the selected section, a given distribution of the shear forces within the section being presupposed. If there occurs a change in the distribution, the calculated shear force must be corrected, for instance by increasing or decreasing the deflection of an indicating instrument. This instrument may show the shear force in percent of the permissible value. Hitherto, this correction has been carried out by manual calculations with the aid of diagrams and the like. However, for reasons of safety and reliability, it was found desirable to provide for an automatic correction of the calculated shear force distribution within a selected section. To this end, the shear force signal of the selected cross-section is supplied to a second device and a third device, said signal being modified in said second device with respect to at least a part of or the entire cargo forward of the selected section and in said third device with respect to at least a part of or the entire cargo aft of the selected section, the numerically largest signal of the modified signals being selected and presented on a suitable instrument.

In the apparatus according to the invention, means for generating a signal representing a total shear force in a cross-section of the ship is connected to a first summing amplifier circuit and a second summing amplifier circuit, and a signal representing at least a part of or the entire cargo forward of the selected cross-section is connected to said first amplifier circuit via a first constant-representing element, while a signal representing at least part of or the entire cargo aft of the selected cross-section is connected to said second amplifier circuit via a second constant-representing element, the two amplifier circuits being connected to a selector circuit adapted to pass on the numerically largest signal of the two signals obtained from said amplifier circuits for indicating said signal on a suitable instrument.

The present invention makes it possible automatically to correct the shear force distribution between longitudinal bulkheads and the shell plating as well as any forces that are transferred directly via the bottom structure. Consequently, there are calculated two corrected values of the respective shear force $T_i$, viz. $T'_{Ki}$ and $T''_{Ki}$ $$T'_{Ki} = T_i + \text{constant} \times d_{j-1} + \text{constant} \times W_{j-1} \ldots \quad (1)$$

$$T''_{Ki} = T_i + \text{constant} \times d_j + \text{constant} \times W_j \ldots \quad (2)$$

wherein $d_{j-1}$ = draught of hull compartment aft of the cross-section $d_j$ = draught of hull compartment forward of the cross-section $W_{j-1}$ = cargo in hull compartment aft of the cross-section $W_j$ = cargo in hull compartment forward of the cross-section.

The total shear force obtained by means of the electronic or electromechanical aid for a section thus is added to the respective correction, whereupon the numerically greatest shear force $T'_{Ki}$ or $T''_{Ki}$ is presented by means of a suitable instrument.

The invention will now be described in more detail, reference being had to the accompanying drawing which illustrates a circuit diagram of an embodiment of the apparatus according to the invention.

The apparatus according to the present invention comprises essentially three components 1, 2 and 3 as shown by dash and dot lines. Component 1 is a summing amplifier circuit serving to produce the quantity $T'_{Ki}$ in equation (1), while component 2 is a basically identical summing amplifier circuit for producing the quantity $T''_{Ki}$ in equation (2). Component 3 is a selector circuit for selecting the numerically largest quantity of either $T'_{Ki}$ and $T''_{Ki}$ as obtained from said amplifier circuits 1 and 2. The selected largest quantity, either $T'_{Ki}$ or $T''_{Ki}$, is represented by means of an instrument 4 which in the present case is a pointer instrument indicating in percent of a permissible value the shear force corrected within a given section with respect to the shear force distribution. The circuits illustrated in the drawing are required for each cross-section of the ship, in which section it is desired to correct the shear force or the shear force stresses in the above-mentioned manner.

The amplifier component 1 comprises an operation amplifier 5, the plus input of which is connected to e.g. an electronic or electromechanical device for generating a number of voltage signals representing the lightweight, mean draught, and trim of the ship, the shear force within a given cross-section of the ship, and the cargo in the hull compartments forward of the selected section. The lightweight signal is applied to the plus input of the operation amplifier 5 via resistor $R_1$, the deadweight signal is applied to the plus input via a resistor $R_2$, the trim signal is applied to the plus input via a resistor $R_3$, the shear force signal is applied to the plus input via a resistor $R_4$, and the load circuit is applied to the plus input via a resistor $R_5$. Essentially the same is true also of the summing amplifier circuit 2 which comprises an operation amplifier 6, the minus input of which is applied to the above-mentioned signal voltages, and in addition the shear force signal is applied to the plus input of the amplifier 6 via a resistor $R_6$, and the cargo signal represents the cargo in the hull compartments aft of the selected section and is applied to the minus input via a resistor $R_7$. The trim signal is applied to the minus input via a resistor $R_8$, the deadweight signal is applied to the minus input via a resistor $R_9$, and the lightweight signal is applied to the minus input via a resistor $R_{10}$. In the summing amplifier circuit 1 the deadweight signal is modified by means of the resistor $R_2$ in such a manner that there occurs on the plus input a signal representing the draught of the compartments forward of the selected section. In the summing amplifier circuit 2 the resistance $R_9$ has a corresponding function in that it modifies the deadweight signal into a signal on the minus input of the amplifier 6, which signal represents the draught of the compartments aft of the selected section. The minus input of the amplifier 6 besides is connected to a reference source of 0V via a resistor $R_{11}$ and to the output of the amplifier 6 via a resistor $R_{12}$. The amplifier 5 also has a feedback resistor $R_{13}$ which is connected between the output and the minus input of the amplifier 5, the minus input besides being connected to a voltage input of –10V via a resistor $R_{14}$, while the plus input of the amplifier 6 is connected to a voltage input of –10V via a resistor $R_{15}$.

The outputs of the summing amplifier circuits 1 and 2 are so connected to the selector component 3 that the output of the operation amplifier 5 is connected to a diode bridge $D_1$-$D_4$ via a resistor $R_{17}$, while the output of the operation amplifier 6 is connected to the diode bridge $D_1$-$D_4$ via a resistor $R_{16}$. The resistor $R_{16}$ is connected to the connection between the diodes $D_3$ and $D_4$, while the resistor $R_{17}$ is connected to the connection between the diodes $D_1$ and $D_2$. Furthermore, the output of the operation amplifier 5 is connected to the source of a field effect transistor 7 and to the gate of the field effect transistor 7 via a resistor $R_{18}$, while the output of the operation amplifier 6 is connected to the source of a field effect transistor 8 directly and to the gate of a field effect transistor 8 via a resistor $R_{19}$. The drains of the field effect transistors 7 and 8 are connected via a resistor $R_{20}$ to one input of an instrument 4, the output of which is connected to a voltage input of 0V. The connection between the diodes $D_1$ and $D_4$ in the diode bridge $D_1$-$D_4$ is connected to the minus input of an operation amplifier 9, while the connection between the diodes $D_2$ and $D_3$ in the diode bridge is connected to the plus input of the operation amplifier 9. The minus input of the operation amplifier 9 is connected to a voltage input of 0V via a resistor $R_{21}$ and to the output of the operation amplifier 9 via a capacitor C. The plus input of the operation amplifier 9 is connected to a voltage input of 0V via a resistor $R_{22}$ and to a voltage input of 0V via resistors $R_{23}$ and $R_{24}$ connected in series with one another. The connection between the resistors $R_{23}$ and $R_{24}$ is connected to the output of the amplifier 9 via a resistor $R_{25}$. The output of the amplifier is connected via a zener diode Z and two resistors $R_{26}$ and $R_{27}$ to a voltage input of –15V. The zener diode Z and the resistors $R_{26}$ and $R_{27}$ are connected in series with one another. The connection between the resistors $R_{26}$ and $R_{27}$ is connected to the base of a transistor 10, the emitter of which is connected to a voltage input of –15V, while the collector of the transistor 10 is connected to the control electrode of the field effect transistor 8 via a diode $D_5$, to a voltage input of +15V via a resistor $R_{28}$, and to the base of a transistor 11 via a resistor $R_{29}$. The base of the transistor 11 is connected to a voltage input of –15V via a resistor $R_{30}$, while its emitter is connected to a voltage input of –15V, and the collector is connected on one hand to a voltage input of +15V via a resistor $R_{31}$ and, on the other hand, to the control electrode of the field effect transistor 7 via a diode $D_6$.

The circuit of the selector component 3 operates in such a manner that when the signal of the output from the operation amplifier 5 is greater than the signal of the output from the operation amplifier 6, the circuit throttles the field effect transistor 8 and renders the field effect transistor 7 conductive, whereby the signal from the output of the operation amplifier 5 is passed on to the instrument 4 which shows the largest shear force prevailing in the selected cross-section and corrected for shear force distribution within the selected section. If, on the other hand, the output signal from the operation amplifier 6 is greater than the output signal from the operation amplifier 5, the field effect transistor 7 will be throttled and the field effect transistor 8 will be rendered conductive to pass the output signal from the operation amplifier 6 on to the instrument 4 which will thus always show the greatest shear force in a selected cross-section independently of its sign.

The opening and closing of field effect transistors 7 and 8 is controlled by the flip-flop formed by transistors 10 and 11. This flip-flop is set from the signal output of the operation amplifier 9. If the signal at the output of the operation amplifier is insufficient to render the transistor 10 conductive the transistor 11 will be made conductive and open the transistor 7. If however the signal on the operation amplifier 9 is sufficiently large the transistor 10 is rendered conductive and transistor 11 is rendered nonconductive whereby the transistor 8 will be conductive. When the transistor 7 is made conductive the signal from the output of the amplifier 5 is shown on the pointer instrument 7 and if the transistor 8 is made conductive the output signal from the output of the amplifier 6 is shown on the pointer instrument 4.

The diode bridge D1-D4 and the operation amplifier 9 are utilized for obtaining the numerical difference of the signals from the amplifiers 5 and 6 regardless of the sign. The output signal from the operation amplifier will always be the difference of the output signal from the amplifier 5 and the output signal from the amplifier 6 regardless of the sign of these signals.

What we claim and desire to secure by Letters Patent is:

1. An apparatus for correcting a signal representing total shear force in a given cross-section of a ship for the distribution of shear forces within said section, comprising means for applying said signal to a first summing amplifier means means for applying a signal representing at least part of the entire cargo forward of the selected cross-section to said first summing amplifier means, means for applying said total shear force signal to a second summing amplifier means, means for applying a signal representing at least part of the cargo aft of the selected cross-section, to said second summing amplifier means, selector circuit means connected to said amplifier means and for passing on the numerically largest signal of the two output signals obtained from said amplifier means and means for indicating said largest signal.

2. An apparatus as claimed in claim 1, further comprising means for applying a signal representing the draught of the compartments forward of the selected cross-section to said first amplifier means and means for applying a signal representing the draught of the compartments aft of said selected cross-section to said second amplifier means.

* * * * *